United States Patent [19]

Vogel

[11] Patent Number: 5,054,845

[45] Date of Patent: Oct. 8, 1991

[54] PASSENGER SEAT HAVING YIELDING BAND STRUCTURE

[75] Inventor: Ignaz Vogel, Karlsruhe, Fed. Rep. of Germany

[73] Assignee: Ignaz Vogel GmbH & Co. KG Fahrzeugsitze, Karlsruhe, Fed. Rep. of Germany

[21] Appl. No.: 522,981

[22] Filed: May 14, 1990

[30] Foreign Application Priority Data

Feb. 21, 1990 [EP] European Pat. Off. ........ 90103289.6

[51] Int. Cl.[5] ............................................. B60R 21/00
[52] U.S. Cl. ..................................... 297/216; 297/452
[58] Field of Search ......................... 297/216, 460, 452

[56] References Cited

U.S. PATENT DOCUMENTS

| | | | |
|---|---|---|---|
| 2,843,195 | 7/1958 | Barvaeus | 297/460 |
| 3,537,751 | 11/1970 | Masahiko et al. | 297/460 |
| 3,627,379 | 3/1971 | Faust | 297/216 |
| 3,877,749 | 4/1975 | Sakurai et al. | 297/216 |
| 3,967,852 | 7/1976 | Eiselt et al. | 297/452 |
| 4,109,959 | 8/1978 | Barecki et al. | 297/216 |
| 4,192,545 | 4/1980 | Higuchi et al. | 297/216 |

FOREIGN PATENT DOCUMENTS

| | | | |
|---|---|---|---|
| 608267 | 8/1926 | France | 297/460 |
| 5025 | of 1893 | United Kingdom | 297/460 |

OTHER PUBLICATIONS

Page 18 Western Aviation, May 1957.

*Primary Examiner*—Kenneth J. Dorner
*Assistant Examiner*—James M. Gardner

[57] ABSTRACT

In a passenger seat for people movers such as trains, buses, ships and airplanes wherein a backrest with a circumferential frame extends upwardly from the seat's seating structure and has a back support mounted thereon, the back support has an opening formed therein just above the seating structure at about knee level for a passenger seated behind and a band structure adapted to yield to a predetermined limit when subjected to a knee impact by a passenger thrown forward onto the backrest ahead extends between the side members of the frame so as to permit forward movement of the knees into the opening in the backrest.

7 Claims, 1 Drawing Sheet

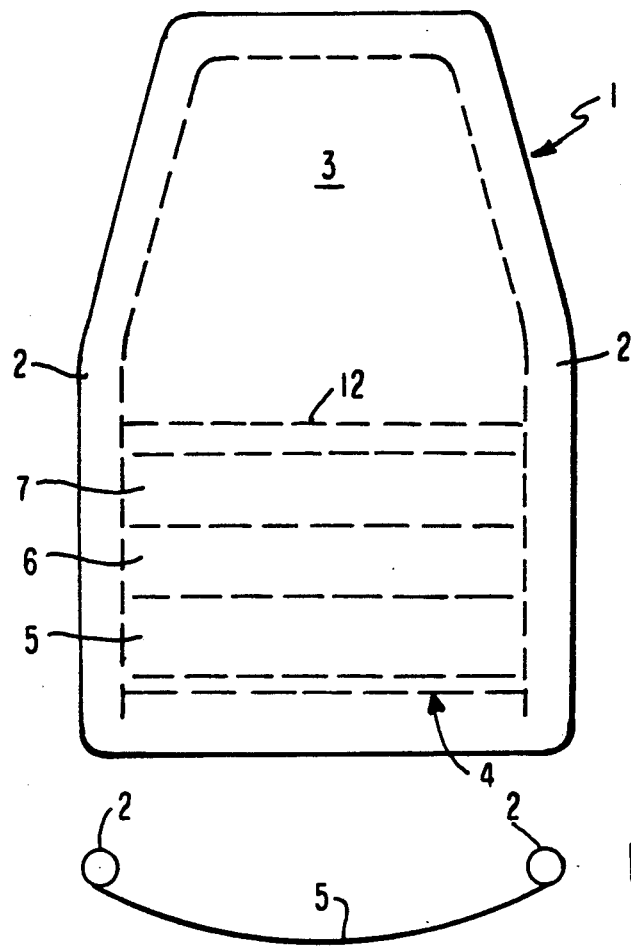
FIG. 1
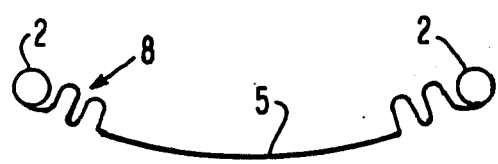
FIG. 2
FIG. 3
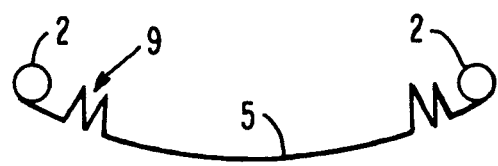
FIG. 4
FIG. 5
FIG. 6
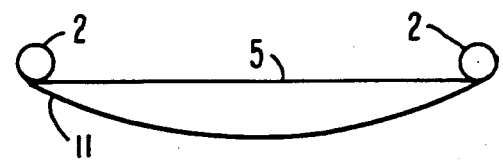

PASSENGER SEAT HAVING YIELDING BAND STRUCTURE

BACKGROUND OF THE INVENTION

The invention relates to a passenger seat for people movers such as buses, boats and airplanes, in which such seats are mounted in rows behind one another.

These seats are designed not only for good comfort of the passengers but they are also designed for their safety, that is, they should be constructed in such a manner that the negative consequences of an accident are as much as possible eliminated. The passenger seats therefore need to be not only rugged and safely secured but they also need to retain bodies striking them during an accident in such a manner that injuries are essentially avoided. In view of this requirement the seats which are quite rigid are generally provided with large-surface cover sheets on the back of their backrests which sheets are intended to absorb the forces of impact by any bodies hitting them without injuries to the bodies. Tests however have revealed that these large-surface cover sheets have the disadvantage that a passenger who, during an accident, is thrown forward onto the cover sheet of the seat in front of his, will hit the cover sheet first with his knees and his upper body is then pushed upwardly and finally over the backrest of the seat ahead. Such forward and upward movement was found to lead not only to substantial knee injuries but also to upper body injuries and—with unfortunate settings of the headrests—also to facial injuries and accident traumas. All these injuries could be avoided if the bodies would only move straight forward during accidents such that the large area cover of the seat back ahead could appropriately absorb the deceleration forces of a body impacting thereon.

It is therefore the principal object of the present invention to provide a passenger seat arrangement with which the chances that, during an accident when a passenger is catapulted forward onto the backrest of the seat ahead, his or her chances of surviving without injuries are substantially improved.

SUMMARY OF THE INVENTION

The object of the invention is achieved with a passenger seat for trains, buses, boats or airplanes with rows of seats arranged behind one another wherein for each seat provided with a backrest with a circumferential frame extending upwardly from the seat's seating structure and having a back support mounted thereon, an opening is formed in the back support just above the seating structure about at knee level of a passenger seated in the seat behind and behind a cover a band structure adapted to yield to a predetermined limit when subjected to a knee impact by a passenger thrown forward onto the backrest from the seat behind extends between the side members of the frame so as to permit forward movement of such passenger's knees into the opening in the backrest.

With this arrangement the knees of a passenger who impacts onto the backrest of the passenger seat ahead break the relatively thin cover and hit the band structure which is resilient and permits forward movement of the knees over the seating surface of the seat ahead. As a result the upper body of such a passenger is not forced upwardly but continues its straight forward movement so that the whole upper body impacts onto the backrest of the seat ahead with relatively low specific forces resulting most likely in no or only minor injuries. Also, the resilient band structure absorbs the impact energy of the knees so that a part of the kinetic body energy is already consumed before the rest of the body impacts onto the backrest ahead.

The band structure which is resilient within relatively narrow limits may be made of various materials. It is pointed out however that it needs to be rigid under normal conditions, so that it is not normally deformable, in order to maintain the proper shape of the backrest. Nevertheless it is possible to provide on the backrest adjacent the band a rigidly molded structure in the configuration of the backrest, which structure is adapted to break or which is resiliently supported as a whole. Such a molded structure may consist for example of a thermoplastic material which is resistant to normal loads but which gives way to the adjacent band structure when impacted by the knees of a body catapulted forward during an accident. Under these circumstances already the molded structure absorbs some energy upon breakage or bending before the passenger's knees engage the adjacent band structure. With such an arrangement the band structure could actually comprise belts similar to those used as seat belts which also provide for limited resiliency.

The band structure may also consist of an irreversibly deformable plastic material which may include several layers including sandwiched therein a fabric layer. It is further possible to utilize a metallic band structure which may well comply with the requirements if it includes waveform or corrugated sections, which can be stretched during knee impact to permit lengthening of the band to the desired limit. The metal band ends may also be wrapped around the side frame of the seat so that, during knee impact, the metal band ends are pulled around the seat frame thereby absorbing a substantial amount of energy. The metal bands may further have holes, but care must be taken that the band will not fracture during impact possibly resulting in injuries to the passenger.

The band structure may consist of a single relatively wide band or a plurality of strips disposed in the seat back on top of one another which last arrangement would provide for a certain force adjustment depending on the size of the passenger.

SHORT DESCRIPTION OF THE DRAWINGS

FIG. 1 shows the back side of a passenger seat; and
FIGS. 2 to 6 show various embodiments of the band structure in the seat's backrest.

DESCRIPTION OF THE PREFERRED EMBODIMENT

As shown in FIG. 1 the backrest 1 of a passenger seat includes a circumferential frame 2 with a back support 3 mounted thereon. The elevation of the seating structure which is arranged in front of the backrest 1 is indicated by a dashed line 4. Upward from the top 4 of the seating structure the backrest 1 is provided with a band structure consisting of bands 5, 6, 7 which are arranged on top of one another so as to extend across an opening or open area 12 between the side members of the frame 2 and which is resilient to a certain limited degree. The band structure is preferably disposed hidden behind the rear backrest cover such that it is invisible for the passenger in the seat behind. If, in accordance with one embodiment, the band structure 5 consists of a resilient irreversibly deformable material such as plastic, then a band shape as indicated in FIG. 2, that is, slightly curved backward between the side members of the frame 2, may be selected. If the band consists of metal the band may have corrugations 8 or pleats 9 adjacent the frame 2 as shown in FIGS. 3 and 4 such that the band is elongated under an extraordinary load to the degree permitted by flattening of the corrugations 8 or pleats 9.

As shown in FIG. 5 the band 5 may also have its ends 10 freely wrapped around the side members of the frame 2 permitting the center of the band to move forward upon load impact while the ends 10 are pulled out from an open loop extending around the frame 2. Finally, FIG. 6 shows a band 5 fixed between the side members of the frame 2 and hidden by a resilient or breakable molded cover 11. Since the passenger seat should be lightweight, it is preferable if the metal band structure consists of a lightweight metal. Also the band structure and the opening in the backrest have a height of up to one half of the backrest.

What is claimed is:

1. A passenger seat for a people mover with rows of seats arranged behind one another, said seat having a seating structure and a backrest extending upwardly from the seating structure and including a circumferential frame having side members and a back support mounted thereon, said back support having an opening formed therein just above the seating structure at about knee level of a passenger seated behind and a metal band structure arranged so as to extend laterally across said opening between the side members of said frame, said band structure being relatively rigid and providing with corrugated portions so as to yield irreversibly to a predetermined limit when subjected to a knee impact by a passenger thrown forward onto the backrest of the seat ahead.

2. A passenger seat according to claim 1, wherein said band structure is a metal band.

3. A passenger seat according to claim 2, wherein the metal of which said metal band is formed is a lightweight metal.

4. A passenger seat according to claim 1, wherein the corrugated portions of said band are pleated portions.

5. A passenger seat according to claim 1, wherein said band structure is covered by a molded cover formed in the shape of the seat's backrest and having a rigidity sufficient to withstand normal loads but being sufficiently weak to yield when hit by the knees of a person thrown forward from the seat behind during an accident.

6. A passenger seat according to claim 1, wherein said band structure includes a number of strips disposed in the seat backrest on top of one another.

7. A passenger seat according to claim 1, wherein the height of the opening in the backrest and the height of said band structure are up to about half the height of the backrest.

* * * * *